United States Patent
Nagano et al.

(10) Patent No.: US 8,653,465 B2
(45) Date of Patent: Feb. 18, 2014

(54) RADIATION DETECTION APPARATUS AND RADIATION IMAGING SYSTEM

(75) Inventors: Kazumi Nagano, Fujisawa (JP); Satoshi Okada, Tokyo (JP); Keiichi Nomura, Honjo (JP); Yohei Ishida, Honjo (JP); Yoshito Sasaki, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 13/091,521

(22) Filed: Apr. 21, 2011

(65) Prior Publication Data
US 2011/0291018 A1 Dec. 1, 2011

(30) Foreign Application Priority Data

May 28, 2010 (JP) ................... 2010-123299

(51) Int. Cl.
*G01T 1/20* (2006.01)
(52) U.S. Cl.
USPC ........................................ 250/369
(58) Field of Classification Search
USPC ........................................ 250/369
See application file for complete search history.

(56) References Cited

U.S. PATENT DOCUMENTS

| | | | |
|---|---|---|---|
| 7,256,404 B2 | 8/2007 | Inoue et al. | 250/370.11 |
| 7,315,027 B2 | 1/2008 | Okada et al. | 250/370.11 |
| 7,391,029 B2 | 6/2008 | Takeda et al. | 250/370.11 |
| 7,417,237 B2 | 8/2008 | Hosoi | 250/483.1 |
| 7,595,493 B2 | 9/2009 | Okada et al. | 250/370.11 |
| 7,723,693 B2 | 5/2010 | Okada et al. | 250/370.01 |
| 2006/0033032 A1 | 2/2006 | Inoue et al. | 250/370.11 |
| 2007/0257198 A1 | 11/2007 | Ogawa et al. | 250/370.11 |
| 2009/0283685 A1 | 11/2009 | Takeda et al. | 250/370.11 |
| 2010/0102236 A1 | 4/2010 | Inoue et al. | 250/361 |

FOREIGN PATENT DOCUMENTS

| | | |
|---|---|---|
| JP | 2004-317167 | 11/2004 |
| JP | 2006-058171 | 3/2006 |
| JP | 2006-078471 | 3/2006 |
| JP | 2006-078472 | 3/2006 |

*Primary Examiner* — David Porta
*Assistant Examiner* — Kenneth J Malkowski
(74) *Attorney, Agent, or Firm* — Fitzpatrick, Cella, Harper & Scinto

(57) ABSTRACT

A radiation detection apparatus including: a sensor panel having a first face on which a pixel region is formed and a second face that is opposite the first face and including a connecting portion at one or more sides; a scintillator layer formed over the pixel region; and a protective film covering the scintillator layer and a portion of the sensor panel is provided. The protective film has a hot-pressed part. At the side of the sensor panel where the connecting portion is formed, the hot-pressed part is formed in a portion of the protective film covering the first face. At other sides of the sensor panel, the hot-pressed part is formed in at least one of a portion of the protective film covering a lateral face of the sensor panel and the second face.

5 Claims, 7 Drawing Sheets

F I G. 3A
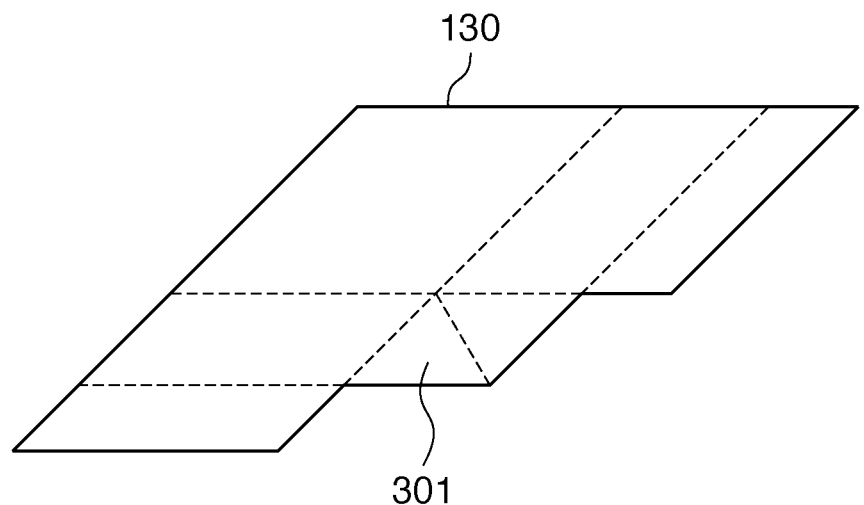
F I G. 3B
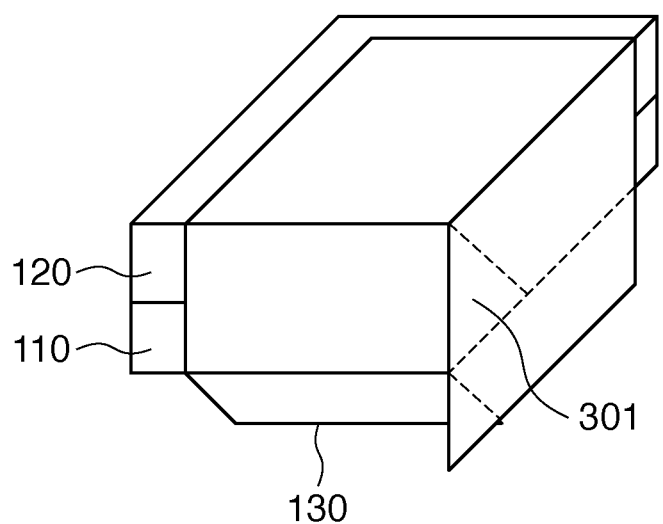

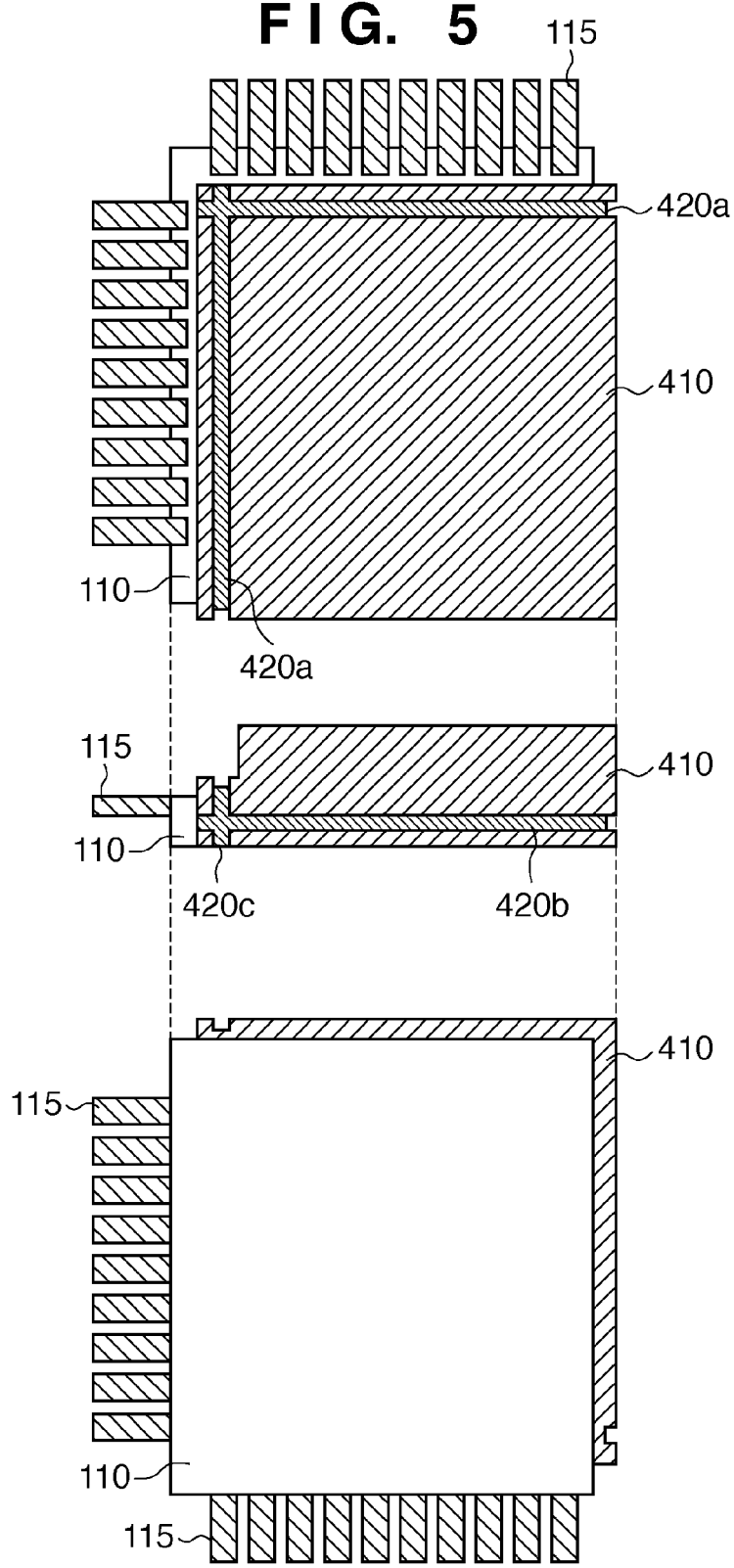
F I G. 5 ated in and constitute a part of the specification, illustrate embodiments of the invention, and together with the description, serve to explain the principles of the invention.

RADIATION DETECTION APPARATUS AND RADIATION IMAGING SYSTEM

BACKGROUND OF THE INVENTION

1. Field of the Invention

The present invention relates to a radiation detection apparatus and a radiation imaging system.

2. Description of the Related Art

In radiation detection apparatuses, in general, scintillators are used to convert radiation to visible light. However, scintillators have a disposition to deliquesce readily by absorbing moisture. In view of this, U.S. Patent Application Publication No. 2007/0257198 discloses that by covering a scintillator layer on a sensor panel with a protective film including a hot-melt resin layer, the humidity resistance of the radiation detection apparatus are improved. And further, at the sides of the sensor panel where a wiring pattern is formed, the protective film is hot-pressed against the front face (a face where the scintillator layer is formed) of the sensor panel. This prevents entry of moisture from gaps between the sensor panel and the protective film into the scintillator layer.

In U.S. Patent Application Publication No. 2006/0033032, in a radiation detection apparatus in which a scintillator layer is formed up to an edge of a sensor panel, a protective film covering the lateral faces of the scintillator layer extends up to the lateral faces or the back face of the sensor panel. This prevents entry of moisture to the scintillator layer at a side of the sensor panel where the scintillator layer is formed up to the edge of the sensor panel.

SUMMARY OF THE INVENTION

In the radiation detection apparatus disclosed in U.S. Patent Application Publication No. 2006/0033032, at the side of the sensor panel where the scintillator layer is formed up to the edge of the sensor panel, a region to be hot-pressed against the front face of the sensor panel cannot be obtained. Therefore, at the side of the sensor panel where the scintillator layer is formed up to the edge of the sensor panel, the protective film is merely adhered closely (by heating and pressuring) to the lateral face or the back face of the sensor panel. However, it is difficult to form the protective film without leaving any gaps to prevent entry of moisture at the lateral faces or the back face of the sensor panel, and, as a result, the radiation detection apparatus disclosed in U.S. Patent Application Publication No. 2006/0033032 is insufficient in humidity resistance. Therefore, one aspect of the present invention provides a technique for improving the humidity resistance of radiation detection apparatuses.

An aspect of the present invention provides a radiation detection apparatus comprising: a sensor panel having a first face on which a pixel region is formed and a second face that is opposite the first face and including a connecting portion electrically connected to the pixel region at one or more sides; a scintillator layer formed over the pixel region of the sensor panel; and a protective film covering the scintillator layer and a portion of the sensor panel neighboring the scintillator layer, wherein the protective film has a hot-pressed part formed by hot-pressing the protective film against the sensor panel, and wherein at the side of the sensor panel where the connecting portion is formed, the hot-pressed part is formed in a portion of the protective film covering the first face of the sensor panel, and wherein at sides of the sensor panel other than the side where the connecting portion is formed, the hot-pressed part is formed in at least one of a portion of the protective film covering a lateral face of the sensor panel and a portion of the protective film covering of the second face of the sensor panel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A and 3B are illustrations of an exemplary protective film 130;

FIG. 5 shows a front view, a plan view, and a bottom view of the exemplary radiation detection apparatus 400 according to the first embodiment;

DESCRIPTION OF THE EMBODIMENTS

Some embodiments of the present invention will be described below with reference to the accompanying drawings.

First Embodiment

Figure 1:
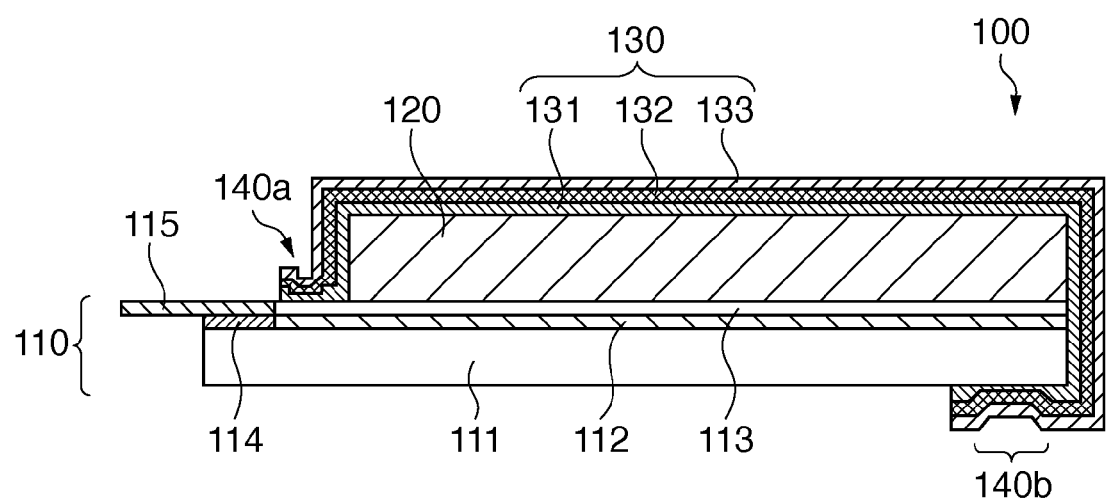
FIG. 1 is a cross-sectional view of an exemplary radiation detection apparatus 100 according to a first embodiment of the present invention.
Figure 2:
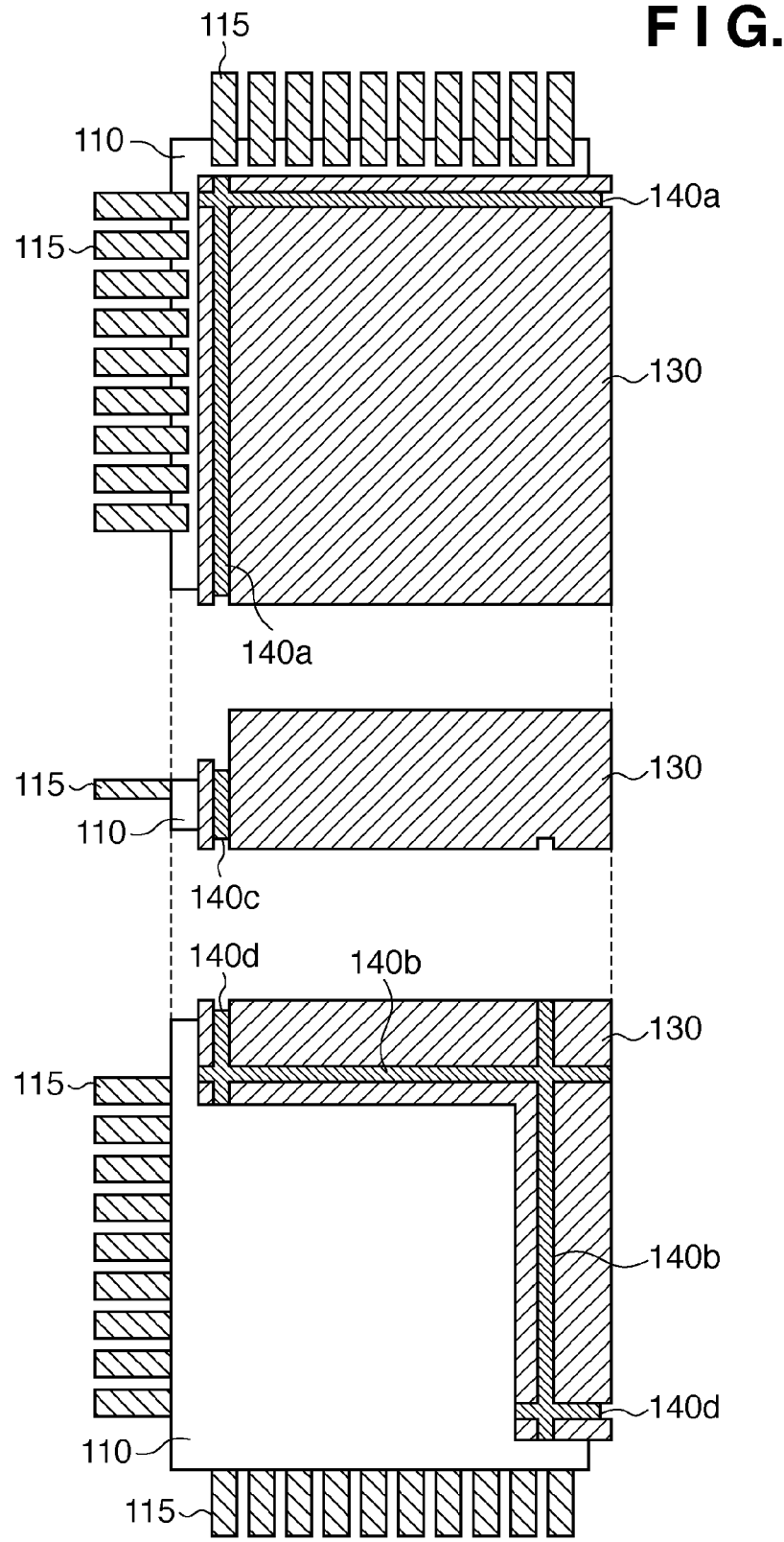
FIG. 2 shows a front view, a plan view, and a bottom view of the exemplary radiation detection apparatus 100 according to the first embodiment.

FIG. 1 is a cross-sectional view of an exemplary radiation detection apparatus 100 according to a first embodiment of the present invention, and FIG. 2 shows a plan view, a front view, and a bottom view of the radiation detection apparatus 100. A right side view of the radiation detection apparatus 100 is not shown because the right side view is symmetric with respect to the front view. The radiation detection apparatus 100 includes a sensor panel 110, a scintillator layer 120, and a protective film 130.

The sensor panel 110 according to the first embodiment includes a sensor substrate 111, a pixel region 112, a sensor protecting layer 113, a connecting portion 114, and wiring members 115. The sensor substrate 111 is made of a material such as glass, or heat-resistant plastic. The sensor substrate 111 includes the pixel region 112 where photoelectric conversion elements, switching elements, gate lines for transmitting on/off signals to turn on/off the switching elements, and signal lines for transmitting signals based on electric charges of the photoelectric conversion elements via the switching elements are formed. Within the pixel region 112, a plurality of pixels is arranged in matrix form. Each pixel includes a photoelectric conversion element and a switching element. The connecting portion 114 is electrically connected with the gate lines or the signal lines. On the pixel region 112, the sensor protecting layer 113 is formed to protect the face of the sensor. A signal from the signal line is transmitted through the connecting portion 114 to the wiring member 115 electrically connected with the connecting portion 114, and then taken out of the radiation detection apparatus 100. As each wiring member 115, a flexible circuit board, for example, is used. On the flexible circuit board, an IC is formed as necessary.

The connecting portion 114 is formed at only some sides of the sensor panel 110, but is not formed at other sides. In this embodiment, the connecting portion 114 is formed at only two neighboring sides of the sensor panel 110; however, other structures such as a structure where the connecting portion 114 is formed at only three sides of the sensor panel 110, for example, may be used. At the side(s) of the sensor panel 110 other than the sides at which the connecting portion 114 is formed, the pixel region 112 is formed up to an edge(s) of the sensor substrate 111.

The scintillator layer 120 is formed over the pixel region 112 with the sensor protecting layer 113 located between the scintillator layer 120 and the pixel region 112. The scintillator layer 120 converts a radiation, such as an X-ray, irradiated to the radiation detection apparatus 100 into light with a wavelength that can be sensed by the photoelectric conversion elements. As the scintillator layer 120, a scintillator having a columnar crystal structure, for example, is used. In the scintillator having such a structure, since generated light propagates through the crystal, the light scarcely scatters, and thus the resolution of the radiation detection apparatus 100 can be improved. Examples of a material for the scintillator having a columnar crystal structure include CsI:Tl, CsI:Na, and CsBr:Tl, which are materials including an alkali halide as a principal component. CsI:Tl can be obtained, for example, by vapor-depositing CsI and TlI simultaneously. At the sides where the connecting portion 114 is not formed, the scintillator layer 120 is formed up to edges of the sensor panel 110.

To improve the durability of the scintillator, the scintillator layer 120 is covered with a protective film 130. In this embodiment, the top face and the lateral faces of the scintillator layer 120 are covered with the protective film 130, and the back face of the scintillator layer 120 is in contact with the sensor panel 110. In other words, there is no exposed portion in the scintillator layer 120. The protective film 130 further covers a portion of the sensor panel 110 neighboring the scintillator layer 120. The protective film 130 includes a hot-melt resin layer 131 in contact with the scintillator layer 120, a reflection layer 132 for reflecting visible radiation from the scintillator layer 120, and a protective layer 133 for protecting the reflection layer 132.

The hot-melt resin layer 131 is formed of a hot-melt resin. Hot-melt resin refers to resin that has a property of adhering to organic and inorganic materials in a state of being melted by heating and a property of not adhering to such materials in a solid state at ordinary temperatures and that contain no solvent. The hot-melt resin used in this embodiment can contain a polyolefin, a polyester, a polyamide or the like as a base polymer (a principal component). In particular, a hot-melt resin based on a polyolefin resin may be used as a material having superior humidity resistance and light transmission property.

Part of visible light converted by the scintillator layer 120 travels in the direction opposite to the photoelectric conversion elements, and the reflection layer 132 reflects the light having traveled in the opposite direction back into the photoelectric conversion elements. The reflection layer 132 also has a function of preventing light not generated at the scintillator layer 120, i.e., extraneous light, from reaching the photoelectric conversion elements. Examples of a material for the reflection layer 132 include metallic foil and metallic thin film. In the case where metallic film is used, entry of moisture can be prevented while fulfilling the function of the reflection layer 132 itself. The thickness of the reflection layer 132 is set at 1 to 100 μm, for example. This is because, if the thickness is smaller than 1 μm, pin hole defects will tend to develop, which may result in poor light shielding properties; and if the thickness is larger than 100 μm, an increase in amount of radiation absorption will take place, which may result in an increase in amount of radiation exposure. As a material for the reflection layer 132, a metallic material, such as aluminum, gold, copper, or an aluminum alloy, may be used; aluminum or gold is used because they have superior reflective properties.

As the protective layer 133, a resin film, for example, is used to prevent the reflection layer 132 from breaking on impact and corroding through moisture. As a material for the protective layer 133, a film material, such as polyethylene terephthalate, polycarbonate, vinyl chloride, polyethylene naphthalate, or polyimide, may be used. The thickness of the protective layer 133 is set at 5 to 100 μm, for example.

To improve the humidity resistance of the radiation detection apparatus 100, the protective film 130 has hot-pressed parts 140a to 140d. The hot-pressed parts 140a to 140d are hereinafter referred to as "hot-pressed part 140" collectively. The hot-pressed part 140 refers to a closely-adhered region where the hot-melt resin layer 131 is made thin by heat pressing process (hot pressing process). The hot-pressed part 140 is superior in humidity resistance to the other parts of the protective film 130.

At the sides of the sensor panel 110 where the connecting portion 114 is formed, the protective film 130 covers the lateral faces of the scintillator layer 120 and extends up to the top face (a first face) of the sensor panel 110. Furthermore, at the sides where the connecting portion 114 is formed, the hot-pressed part 140a is formed in a portion of the protective film 130 covering the top face of the sensor panel 110.

On the other hand, at the sides of the sensor panel 110 where the connecting portion 114 is not formed, the protective film 130 covers the lateral faces of the scintillator layer 120, the lateral faces of the sensor panel 110, and extends up to the back face (a second face) of the sensor panel 110. Furthermore, at the sides where the connecting portion 114 is not formed, the hot-pressed part 140b is formed in a portion of the protective film 130 covering the back face of the sensor panel 110. By further forming the hot-pressed part 140b in the protective film 130 at the sides where the connecting portion 114 is not formed as shown in FIG. 2, the humidity resistance of the radiation detection apparatus 100 according to this embodiment can be improved. At the sides of the sensor panel 110 where the connecting portion 114 is not formed, a hot-pressed part may be formed in a portion of the protective film 130 covering the lateral faces of the sensor panel 110 in addition to or instead of the hot-pressed part 140b.

The protective film 130 according to this embodiment further has the hot-pressed part 140c in a portion covering lateral faces of the sensor panel 110, and has the hot-pressed part 140d at a portion covering the back face of the sensor panel 110. Thus, the hot-pressed parts 140a to 140d constitute a continuous region, and the scintillator layer 120 is entirely surrounded by the region. By entirely surrounding the scintillator layer 120 with the hot-pressed part 140 in such a way, the humidity resistance of the radiation detection apparatus 100 can be further improved.

An exemplary shape of the protective film 130 will be described below with reference to FIGS. 3A and 3B. FIG. 3A is an illustration of the protective film 130 before being used in the radiation detection apparatus 100, and FIG. 3B is an illustration showing a state in which the bonding of the protective film 130 to the radiation detection apparatus 100 is in progress. In FIG. 3B, the right-hand near side of the radiation detection apparatus 100 is partially shown for the sake of easy understanding, and therefore all the parts of the sensor panel 110, scintillator layer 120, and protective film 130 are not shown. Dotted lines on the protective film 130 are fold lines used when bonding the protective film 130 to the radiation detection apparatus 100. The protective film 130 includes folding parts 301; when bonding the protective film 130 to the radiation detection apparatus 100, the folding parts 301 are folded outward and bonded to other parts of the protective film 130 as shown in FIG. 3B. The provision of the folding parts 301 prevent parts of the sensor panel 110 and scintillator layer 120 from being exposed at gaps in the protective film 130 (portions where edges of the protective film 130 are joined together). Note that "being exposed" refers to not only a state in which parts of the sensor panel 110 and scintillator layer 120 can be visually recognized from outside but a state in which there is a possibility of entry of extraneous moisture. By providing the folding parts 301 to the protective film 130 as shown in FIG. 3A, the sensor panel 110 and the scintillator layer 120 are not exposed at the portions of the protective film 130 surrounded by the hot-pressed part 140. This further improves the humidity resistance of the radiation detection apparatus 100. The folding part 301 may be located inside the protective film 130 as shown in FIG. 3B by valley-folding a diagonal line of the folding part 301 or may be located outside the protective film 130 by mountain-folding the diagonal line the folding part 301.

In the following, an exemplary method for manufacturing the radiation detection apparatus 100 according to the first embodiment will be described. Descriptions of the sensor panel 110 and the scintillator layer 120 will be omitted because both the components can be formed using a previously existing technique. To begin with, a method for forming the protective film 130 will now be described. The protective film 130, which has been made by laminating a hot-melt resin, a sheet of aluminum foil, and a resin sheet together, is bonded to the top face of the scintillator layer 120 by use of a heating roller through application of heat and pressure. Then, the protective film 130 is folded so as to conform to the lateral faces of the scintillator layer 120 and the lateral faces of the sensor panel 110 in a state of tension while heat and pressure is further applied. Likewise, the protective film 130 is bonded to the back face of the sensor panel 110 by using a heating and pressing roller.

Next, a method for forming the hot-pressed part 140 will be described below. The hot-pressed part 140 is formed by heating and pressuring the protective film 130 to the sensor panel 110 through use of a heated pressing head. This process is referred to as a "hot pressing process". In the hot pressing process, the pressure is set at 1 to 10 kg/cm$^2$, for example, and the heating and pressuring is carried out for 1 to 60 seconds with the temperature of the heating and pressing head made 10 to 50 K higher than the melting temperature of the hot-melt resin. The width of the hot-pressed part 140 is set at 1 to 20 mm inclusive, for example. This is because if the width is smaller than 1 mm, it will be difficult to ensure sufficient bond strength to the bonding counterpart, and if the width is larger than 20 mm, the resin melted within the hot-pressed region will flow with difficulty and the thickness of the hot-pressed region will thus tend to become uneven. When hot-pressing the protective film 130 against the lateral faces of the sensor substrate 111, uneven pressing on the sensor panel 110 can be prevented by pressing the protective film 130 across the whole lateral face of the sensor substrate 111 at once through use of a heating head.

By doing as above, the radiation detection apparatus 100 according to this embodiment has high humidity resistance.

Figure 4:
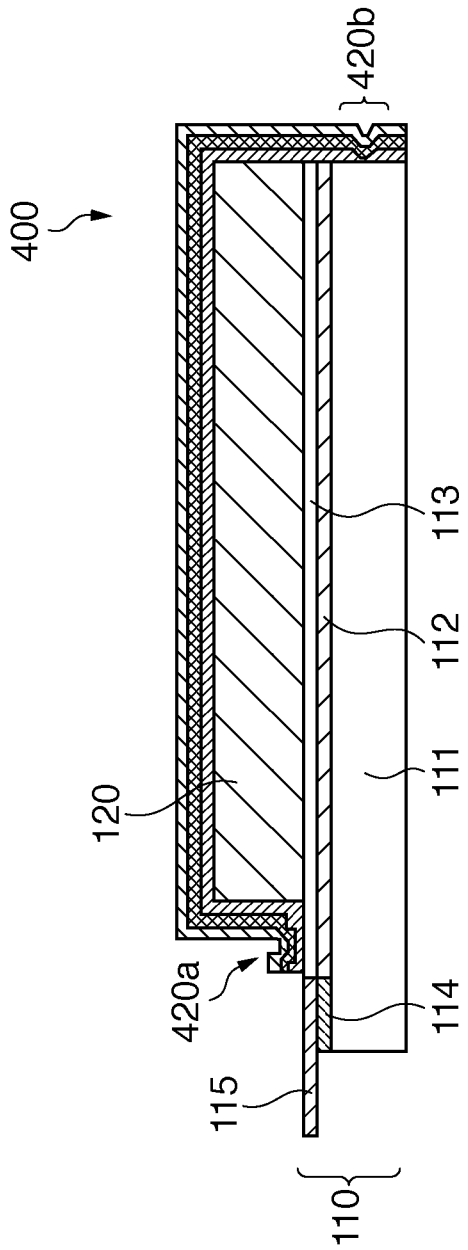
FIG. 4 is a cross-sectional view of another exemplary radiation detection apparatus 400 according to the first embodiment.

A radiation detection apparatus 400, which is a variation on the radiation detection apparatus 100, will be described below with reference to FIGS. 4 to 6. In these figures, the same components as the components of FIGS. 1 to 3B are shown using same reference numerals, and thus descriptions of such components are omitted. FIG. 4 is a cross-sectional view of the radiation detection apparatus 400, and FIG. 5 shows a plan view, a front view, and a bottom view of the radiation detection apparatus 400. A right side view of the radiation detection apparatus 400 is not shown because the right side view is symmetric with respect to the front view.

At the sides of the sensor panel 110 where the connecting portion 114 is not formed, the protective film 410 of the radiation detection apparatus 400 covers the lateral faces of the scintillator layer 120 and further extends up to the lateral faces of the sensor panel 110. However, the back face of the sensor panel 110 is not covered with the protective film 410. In the radiation detection apparatus 400 as well, the protective film 410 has hot-pressed parts 420a to 420c. The hot-pressed parts 420a to 420c are hereinafter referred to as "hot-pressed part 420" collectively. At the sides of where the connecting portion 114 is formed, the hot-pressed part 420a is formed in a portion of the protective film 410 covering the top face of the sensor panel 110. On the other hand, at the sides where the connecting portion 114 is not formed, the hot-pressed part 420b is formed in a portion of the protective film 410 covering the lateral faces of the sensor panel 110. As a result, the humidity resistance of the radiation detection apparatus 400 are improved. Furthermore, as shown in FIG. 5, the hot-pressed part 420c is formed in a portion covering the lateral faces of the sensor panel 110, and this connects the hot-pressed parts 420a and 420b. Consequently, the hot-pressed parts 420a to 420c constitute a continuous region, and this region surrounds the scintillator layer 120 entirely.

Figure 6:
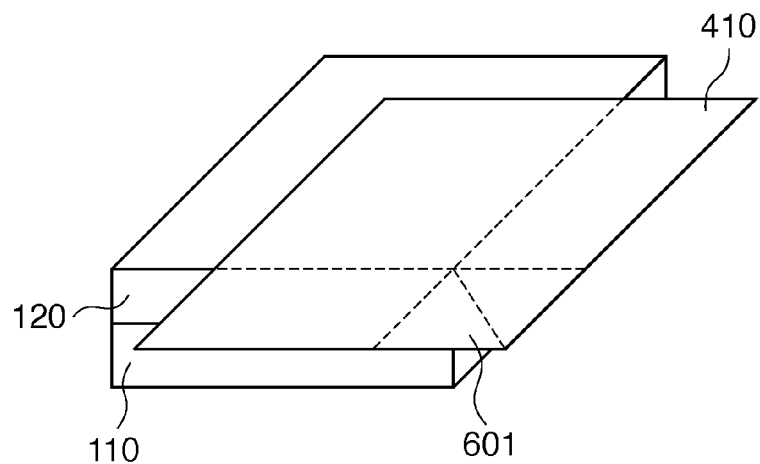
FIG. 6 is an illustration of an exemplary protective film 410.

FIG. 6 is an illustration showing a state in which the bonding of the protective film 410 to the radiation detection apparatus 400 is in progress. In FIG. 6, the right-hand near side of the radiation detection apparatus 400 is partially shown for the sake of easy understanding, and therefore all the parts of the sensor panel 110, scintillator layer 120, and protective film 410 are not shown. Dotted lines on the protective film 410 are fold lines used when bonding the protective film 410 to the radiation detection apparatus 400. The protective film 410 includes folding parts 601; when bonding the protective film 410 to the radiation detection apparatus 400, the folding parts 601 are folded and bonded. The provision of the folding parts 601 prevents parts of the sensor panel 110 and scintillator layer 120 from being exposed from gaps in the protective film 410 (portions where edges of the protective film 410 are joined together).

Moreover, a configuration in which the radiation detection apparatus 100 and the radiation detection apparatus 400 are combined can be used. More specifically, at some sides of the sensor panel 110, the protective film may extend up to the back face of the sensor panel 110 as in the case of the radiation detection apparatus 100, and at other sides of the sensor panel 110, the protective film may extend up to the lateral faces of the sensor panel 110 as in the case of the radiation detection apparatus 400.

Second Embodiment

Figure 7:
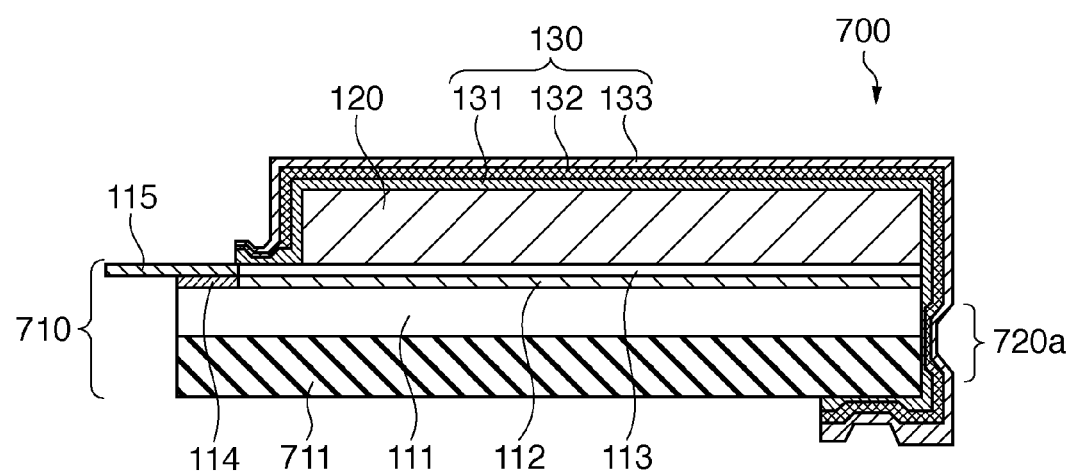
FIG. 7 is a cross-sectional view of an exemplary radiation detection apparatus 700 according to a second embodiment of the invention.

A radiation detection apparatus 700 according to a second embodiment of the present invention will be described below with reference to FIG. 7. In FIG. 7, the same components as the components described in the first embodiment are shown using same reference numerals, and thus descriptions of such components are omitted. A sensor panel 710 according to the second embodiment further includes a support plate 711 that supports the sensor substrate 111 at the back face side (a second face side) of the sensor substrate 111.

The sensor substrate 111, on which the photoelectric conversion elements, the wiring line, and TFTs are formed through execution of many processes such as exposure and development, tends to be made of glass. For glass substrates, the thickness tends to be set at 1 mm or smaller from requirements such as high planarity, high dimensional accuracy, weight reduction, increase in footprint, and cost reduction. In the case where the thickness of the sensor substrate 111 is equal to or smaller than 1 mm, when forming hot-pressed parts at the lateral face sides of the sensor substrate 111, it may be difficult to obtain a sufficient width of the hot-pressed parts because the sensor substrate 111 is insufficient in thickness. And furthermore, since the stiffness of a thinly formed glass plate is low, edges of the glass substrate may be cracked or chipped due to pressure applied at the time of formation of the hot-pressed parts at lateral faces of the glass substrate. In the sensor panel 710 of the radiation detection apparatus 700, a hot-pressed part 720a is formed by performing hot pressing on a pressing face of the protective film 130 that is obtained by combining a lateral face of the sensor substrate 111 and a lateral face of the support plate 711. As a result, the hot-pressed part 720a can be formed so as to have a sufficient width that can improve the humidity resistance, and production of cracks and so on at the edges of the sensor substrate 111 can be prevented.

As a material for the support plate 711, a metal with good workability may be used, or a metal with high radiation absorptance may be used to prevent transmission of irradiated radiation; for example, Pb, Mo, or Al can be used. And further, as another material for the support plate 711, resin may be used to make it function as a stiffness retention layer. The support substrate 711 may have functions of protecting the sensor substrate 111 against impact and bending. As a material used to bond the support plate 711 to the sensor substrate 111, an ordinary bonding agent or an ordinary adhesive can be used. For example, an acrylic or epoxy bonding agent or adhesive can be used. The various modifications described in the first embodiment also can be applied to the radiation detection apparatus 700 according to the second embodiment.

Third Embodiment

Figure 8:
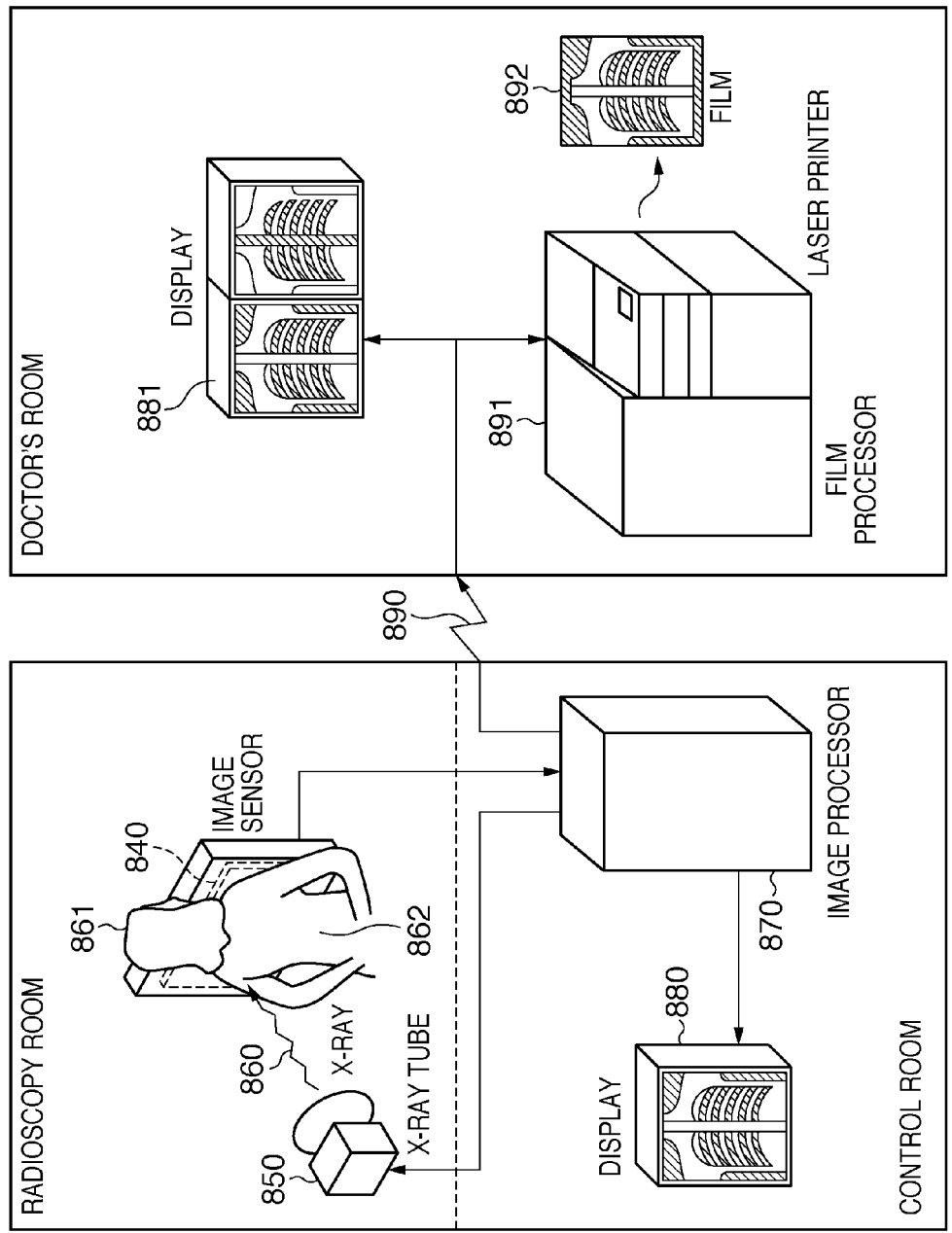
FIG. 8 is an illustration of an exemplary radiation imaging system according to a third embodiment of the invention.

FIG. 8 is an illustration showing an application of the radiation detection apparatus according to the present invention to an X-ray diagnostic system (a radiation imaging system). An X-ray 860 generated at an X-ray tube (a radiation source) 850 passes through the chest 862 of a subject or a patient 861 and comes into an image sensor (a radiation detection apparatus) 840 above which a scintillator is provided. The incoming X-ray includes information on an interior of the body of the patient 861. The scintillator emits light in response to the incoming of the X-ray, and the light is photoelectrically converted, whereby electrical information is obtained. The information is converted into a digital signal, and the signal is processed into image data by an image processor 870 as signal processing means; the image can be observed on a display 880 as display means in the control room. Incidentally, the radiation imaging system includes at least the radiation detection apparatus, and signal processing means for processing signals from the radiation detection apparatus.

Moreover, the image data can be transferred to a remote place by transfer means such as a telephone line 890, following which the data can be displayed on a display 881 as display means in the remote doctor's room or the like or can be stored on storage means such as an optical disk, that is, a doctor(s) working in the remote place can diagnose. And further, the data can be recorded on a film 892 as a recording medium by a film processor 891 as recording means. In addition, the data can be printed out by a laser printer as recording means.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-123299, filed May 28, 2010 which is hereby incorporated by reference herein in its entirety.

What is claimed is:

1. A radiation detection apparatus comprising:
a sensor panel having a first face and having a pixel region formed on said first face, and having a second face that is opposite said first face and including a connecting portion electrically connected to said pixel region at one or more sides;
a scintillator layer formed over said pixel region of said sensor panel; and
a protective film covering said scintillator layer and a portion of said sensor panel neighboring said scintillator layer,
wherein said protective film includes a hot-melt resin layer and has a hot-pressed part comprising a closely-adhered region of said protective film where said hot-melt resin layer is made thin by a heat pressing process, and
wherein, at sides of said sensor panel other than the side where said connecting portion is formed, said protective film covers lateral faces of said scintillator layer and said sensor panel and extends up to said second face, and said hot-pressed part is formed in a portion of said protective film covering said second face of said sensor panel.

2. The apparatus according to claim 1,
wherein, at the side of said sensor panel where said connecting portion is formed, said hot-pressed part is formed in a portion of said protective film covering said first face of said sensor panel, and
wherein, at sides of said sensor panel other than the side where said connecting portion is formed, said hot-pressed part is formed in the portion of said protective film covering said second face of said sensor panel and a portion of said protective film covering a lateral face of said sensor panel, and
wherein said scintillator layer is entirely surrounded with said hot-pressed part.

3. The apparatus according to claim 1, wherein said sensor panel comprises:
a substrate on which said pixel region is formed; and
a support plate that supports said substrate from the second face side of said substrate.

4. The apparatus according to claim 1, wherein said hot-melt resin layer is arranged in contact with said scintillator layer.

5. A radiation imaging system comprising:
the radiation detection apparatus according to claim 1; and a signal processing unit that performs processing of a signal obtained from said radiation detection apparatus.

* * * * *